United States Patent
Igarashi et al.

(10) Patent No.: US 9,266,259 B2
(45) Date of Patent: Feb. 23, 2016

(54) METHOD OF FORMING HOLLOW BLOW-MOLDED FOAM AND SUCH HOLLOW BLOW-MOLDED FOAM

(75) Inventors: Yu Igarashi, Kanagawa (JP); Masaaki Onodera, Kanagawa (JP); Yoshinori Ohno, Kanagawa (JP)

(73) Assignee: Kyoraku Co. Ltd., Tokyo (JP)

( * ) Notice: Subject to any disclaimer, the term of this patent is extended or adjusted under 35 U.S.C. 154(b) by 0 days.

(21) Appl. No.: 13/336,176

(22) Filed: Dec. 23, 2011

(65) Prior Publication Data
US 2013/0164474 A1 Jun. 27, 2013

(51) Int. Cl.
| B29D 22/00 | (2006.01) |
| B29C 35/16 | (2006.01) |
| B29C 49/64 | (2006.01) |
| B29C 44/08 | (2006.01) |
| B29L 22/00 | (2006.01) |
| B29K 23/00 | (2006.01) |
| B29K 105/04 | (2006.01) |

(52) U.S. Cl.
CPC ............... *B29C 35/16* (2013.01); *B29C 44/08* (2013.01); *B29C 49/64* (2013.01); *B29C 2035/1658* (2013.01); *B29C 2035/1691* (2013.01); *B29K 2023/0625* (2013.01); *B29K 2023/12* (2013.01); *B29K 2105/04* (2013.01); *B29K 2995/0073* (2013.01); *B29L 2022/00* (2013.01); *Y10T 428/1376* (2013.01)

(58) Field of Classification Search
None
See application file for complete search history.

(56) References Cited

U.S. PATENT DOCUMENTS

| 4,115,491 A | 9/1978 | Hanning |
| 4,244,913 A * | 1/1981 | Ryder ............................ 264/348 |
| 4,923,659 A * | 5/1990 | Kunz ............................... 264/85 |
| 5,798,080 A | 8/1998 | Ogura |
| 6,303,071 B1 * | 10/2001 | Sugawara et al. ............. 264/526 |
| 6,746,643 B1 * | 6/2004 | Kannari ......................... 264/523 |
| 2001/0031328 A1 * | 10/2001 | Shiromoto et al. .......... 428/36.5 |
| 2004/0166269 A1 * | 8/2004 | Imanari et al. ............... 428/36.5 |
| 2011/0048571 A1 | 3/2011 | Onodera et al. |
| 2011/0104414 A1 * | 5/2011 | Onodera et al. ............. 428/36.5 |

FOREIGN PATENT DOCUMENTS

| EP | 2246175 A1 | 11/2010 |
| JP | 9085817 A | 3/1997 |
| JP | H1158503 A | 8/1998 |
| JP | 2000141464 A | 5/2000 |
| JP | 2000280332 A | 10/2000 |

(Continued)

OTHER PUBLICATIONS

EP Search Report dated May 22, 2012 of Patent Application No. EP 11194803.0 filed Dec. 21, 2011.

(Continued)

*Primary Examiner* — Monica Huson
(74) *Attorney, Agent, or Firm* — Maine Cernota & Rardin

(57) ABSTRACT

An object of the present invention is to provide a method of forming a hollow blow-molded foam and also provide such a hollow-molded foam, which are capable of improving a flow-rate efficiency of a fluid that flows through the inside of the hollow blow-molded foam. A foaming resin is sandwiched between molds so that a hollow blow-molded foam having a ventilation path is molded, and a fluid for use in cooling the hollow blow-molded foam is allowed to flow through the ventilation path so that the hollow blow-molded foam is cooled.

8 Claims, 9 Drawing Sheets

(56) References Cited

FOREIGN PATENT DOCUMENTS

| JP | 2004-116959 A | 4/2004 |
| JP | 2009-233960 A | 10/2009 |
| JP | 2010167628 A | 8/2010 |
| WO | 02078928 A1 | 10/2002 |

OTHER PUBLICATIONS

JP Office Action dated Mar. 14, 2014 of Patent Application 2010-142769.

* cited by examiner

FIG. 8A
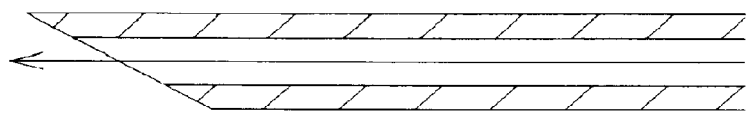
FIG. 8B
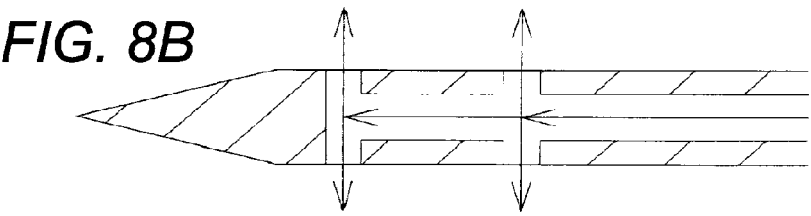
←: BLOW-IN/BLOW-OUT DIRECTION
FIG. 9
| COOLING TIME | 45 SEC. | 60 SEC. | 75 SEC. |
|---|---|---|---|
| WITHOUT AIR CIRCULATION | 91.5°C | 72.5°C | 60.5°C |
| WITH AIR CIRCULATION | 79°C | 63.5°C | 48°C |

FIG. 10A

|         | 1     | 2     | 3     | 4     | 5     | AVE    |
|---------|-------|-------|-------|-------|-------|--------|
| Ra (μm) | 13.6  | 20.8  | 16.4  | 16.8  | 16.8  | 16.88  |
| Ry (μm) | 344.4 | 390.8 | 184.8 | 173.6 | 168.2 | 252.36 |
| Rz (μm) | 113.4 | –     | 105   | 101.4 | 102.4 | 105.55 |
| Sm (mm) | 0.737 | 1.5   | 0.721 | 0.952 | 0.952 | 0.972  |

FIG. 10B

|         | 1     | 2     | 3     | 4     | 5    | AVE    |
|---------|-------|-------|-------|-------|------|--------|
| Ra (μm) | 6.2   | 6.2   | 9     | 7.6   | 7.4  | 7.28   |
| Ry (μm) | 71    | 94.4  | 121.4 | 104   | 121  | 102.36 |
| Rz (μm) | 47    | –     | 69.8  | 52.2  | –    | 56.33  |
| Sm (mm) | 0.677 | 1.68  | 0.623 | 0.982 | 2.28 | 1.248  |

*FIG. 11*

|  | SUPPLIED GAS VOLUME (m$^3$/h) | PRESSURE LOSS AT 25°C (Pa) |
|---|---|---|
| WITHOUT AIR CIRCULATION | 333 | 210 |
| FORWARD AIR CIRCULATION DIRECTION | 333 | 200 |
| REVERSED AIR CIRCULATION DIRECTION | 333 | 204 |

METHOD OF FORMING HOLLOW BLOW-MOLDED FOAM AND SUCH HOLLOW BLOW-MOLDED FOAM

FIELD OF THE INVENTION

The present invention relates to a method of forming a hollow blow-molded foam and such a hollow blow-molded foam.

BACKGROUND OF THE INVENTION

In recent years, there have been strong demands for automobiles to have a wider inner space for a high roof, wider sheets, and the like. Thus, ducts for automobiles are required to be compact and to smoothly flow air at a desired flow rate. Moreover, various ducts having different shapes are required for every type of automobiles.

In order to address these demands, related art ducts for automobiles have been made of a hollow molded product composed of high-density polyethylene, polypropylene and the like. The hollow molded product made from these materials can be easily formed into various shapes. In addition, the hollow molded product makes it possible to easily maintain a desired amount of air flow. Therefore, the hollow molded product is desirably used as ducts for automobiles.

However, noise generated by a compressor of an air conditioner and noise generated by an air flow passing through ducts are leaked out of a duct blowing outlet. In recent years, there have been demands for reducing these noises. However, the material for a related art molded product is a non-foaming resin such as a high-density polyethylene, and polypropylene. For this reason, the hollow molded product itself doesn't have a function for absorbing noise.

JP-A No. 2004-116959 has proposed a duct that can reduce noise generated by a compressor of an air conditioner and noise generated by an air flow passing through ducts. It is described that this duct has superior properties, such as a dew condensation preventive property, a heat-insulating property, a heat resistant property and a light weight property, as well as strength that is sufficient in practical use, and can be produced by using simple processes.

More specifically, the duct disclosed in that application is formed by using an intermediate blow-molded foam that has an apparent density in a range from 0.05 to 0.5 g/cm$^3$, and a closed cell rate of 50% or more. Moreover, the inner surface of the hollow blow-molded foam has a surface hardness of 45 to 80 degrees.

As described in the '959 reference, the hollow blow-molded foam has an apparent density in a specific range and a closed cell rate in a specific range. Moreover, the hollow blow-molded foam has a surface hardness on its inner surface within a specific range. As a result, the duct made of such a hollow blow-mold foam has a superior sound absorbing property. Moreover, the duct makes it possible to reduce noise generated by a compressor of an air conditioner and noise generated by an air flow passing through ducts.

For example, a hollow blow-molded foam disclosed in the '959 reference is manufactured in the following method. As illustrated in FIG. 13, a foaming parison composed of a thermoplastic resin and a foaming agent is extruded from a die. The foaming parison is disposed in split mold blocks provided with a pressure-reducing pipe. Then, the foaming parison is sandwiched by the mold. While a gas such as air is being blown into the foaming parison, the split mold blocks are closed. As the split mold blocks are closed, the foaming parison is deformed along the shape of a cavity. Simultaneously, the foaming parison tightly adheres to the inner surfaces of the split mold blocks. When the split mold blocks are completely closed, a space (air passage) defined by walls of a hollow blow-molded foam is formed as illustrated in FIG. 14. In the closed state of the split mold blocks, the hollow blow-molded foam is cooled by using a cooling device not shown. The hollow blow-molded foam thus formed has an apparent density of 0.05 to 0.5 g/cm$^3$ and a closed cell rate of 50% or more. The inner surface of the hollow blow-molded foam has a surface hardness of 45 to 80 degrees.

However, in some cases, a hollow blow-molded foam having a high expansion ratio (for example, an expansion ratio of 2.5 folds or more) and a high thickness (for example, thickness of 2.0 mm or more) is produced by using the above forming method. In this case, the thickness of the hollow blow-molded foam becomes thicker during the forming process.

However, in the case when the thickness of the hollow blow-molded foam becomes thicker during the forming process, the heat insulating property of the hollow blow-molded foam itself becomes higher. For this reason, upon cooling the hollow blow-molded foam, the cooling process sometimes fails to sufficiently cool the inside of each wall of the hollow blow-molded foam. In the case when the inside of each wall is not cooled sufficiently, withdrawing and warping tend to occur in the hollow blow-molded foam. As a result, the time required for cooling the hollow blow-molded foam needs to be prolonged. Moreover, after taking out the hollow blow-molded foam from the split mold blocks, the shape of the hollow blow-molded foam also needs to be corrected.

When the cooling process for the wall inside the hollow blow-molded foam is delayed, the inner cells of the wall are expanded to become bulky. As a result, cells are ruptured to sometimes cause a roughened inner surface of the wall. When the inner surface of the wall is roughened, a resistance to air (fluid) flowing through a space (air flow passage) defined by the walls increases. This causes a reduction in the flow-rate efficiency of a fluid that flows through the inside of the hollow blow-molded foam.

SUMMARY OF THE INVENTION

In view of the above-mentioned circumstances, the present invention has been devised. The object of the present invention is to provide a method of forming a hollow blow-molded foam capable of improving the flow-rate efficiency of a fluid that is allowed to flow through the inside of the hollow blow-molded foam and such a hollow blow-molded foam.

In order to achieve the object, the method of forming a hollow blow-molded foam and the hollow blow-molded foam in accordance with the present invention have the following configurations.

A method of forming a hollow blow-molded foam in accordance with the present invention includes the steps of:

molding a hollow blow-molded foam having a ventilation path by sandwiching a foaming resin between molds; and cooling the hollow blow-molded foam by allowing a fluid for use in cooling the hollow blow-molded foam to flow through the ventilation path.

A hollow blow-molded foam in accordance with the present invention is provided with:

a hollow blow-molded foam having a ventilation path inside thereof, and in this structure, the surface of the ventilation path has an average roughness Rz on ten points of 100 μm or less.

In accordance with the present invention, the flow-rate efficiency of a fluid that is allowed to flow through the inside of the hollow blow-molded foam can be improved.

BRIEF DESCRIPTION OF THE DRAWINGS

FIG. 8A is a schematic cross-sectional view that shows a structure of a needle with a diagonally-cut tip;

FIG. 8B is a schematic cross-sectional view that shows a rocket-shaped needle;

FIG. 9 is a drawing that shows the results of measurements of inner-surface temperatures;

FIG. 10A is a drawing that shows the results of measurements of surface roughness (without air circulation);

FIG. 10B is a drawing that shows the results of measurements of surface roughness (with air circulation);

FIG. 11 is a drawing that shows the results of measurements of pressure loss;

DETAILED DESCRIPTION

Figure 1:
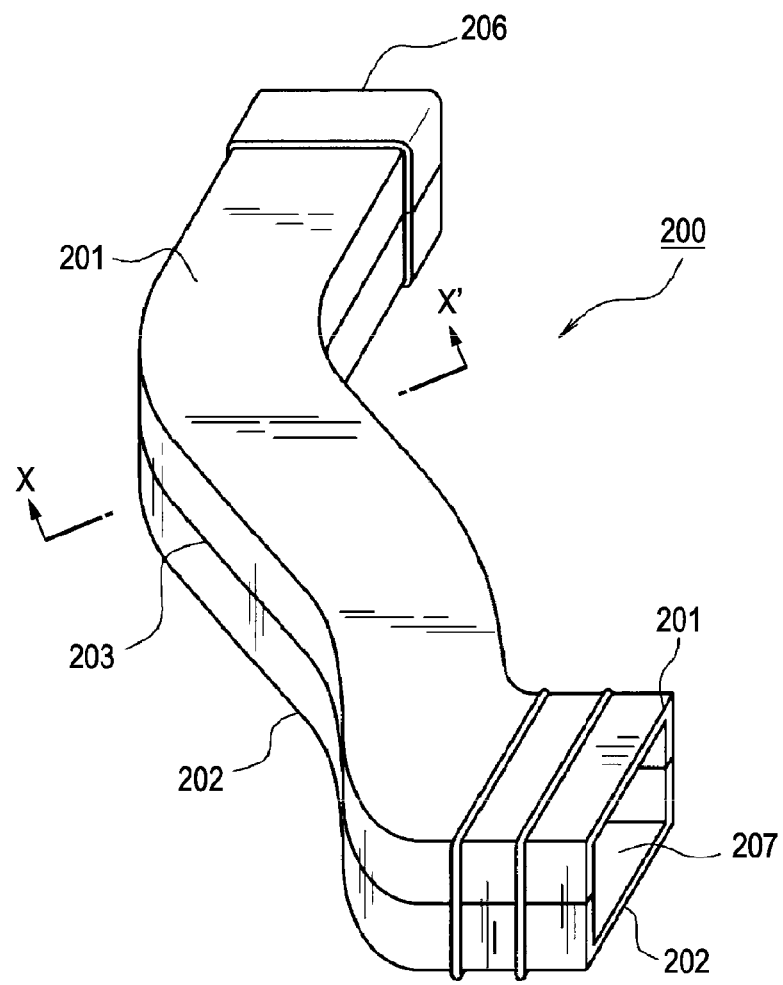
FIG. 1 is a perspective view that illustrates an external structure of a hollow blow-molded foam in accordance with a first embodiment of the present invention.
Figure 2:
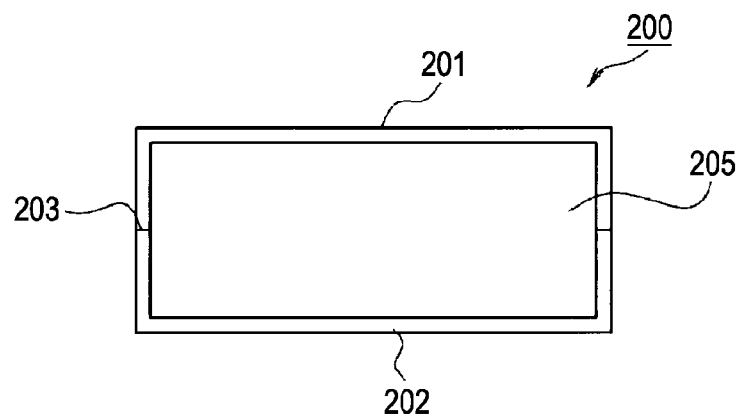
FIG. 2 is a cross-sectional view taken along line X-X' of FIG. 1.
Figure 3:
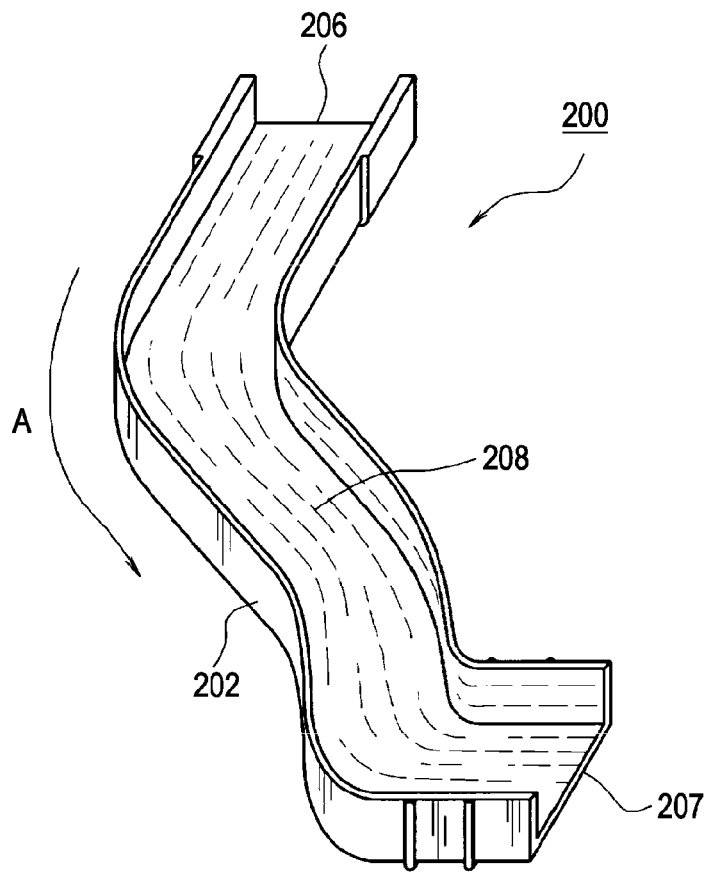
FIG. 3 is a perspective view that illustrates a surface shape of inner surfaces of a wall part forming a ventilation path of the hollow blow-molded foam in accordance with the first embodiment of the present invention.
Figure 4:
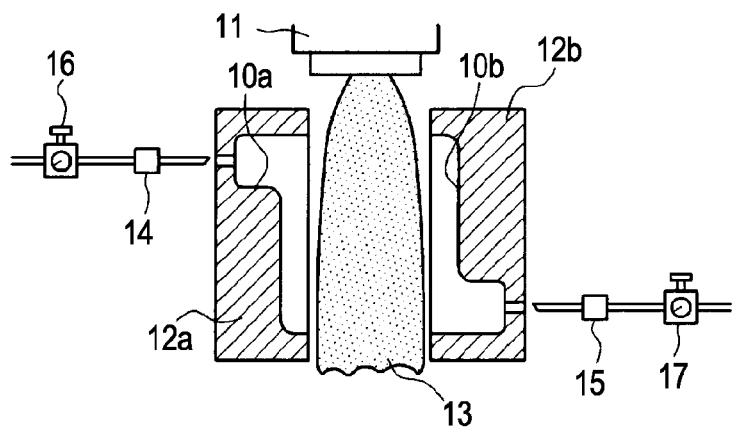
FIG. 4 is a first view that explains one example of a method for preparing the hollow blow-molded foam in accordance with the first embodiment.
Figure 5:
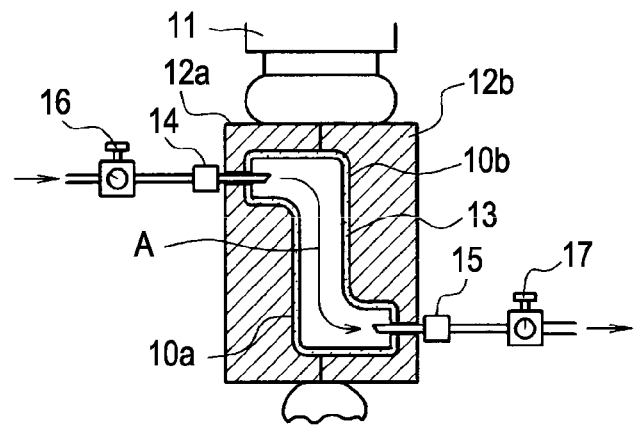
FIG. 5 is a second view that explains another example of a method for preparing the hollow blow-molded foam in accordance with the first embodiment.

First, the outline of a hollow blow-molded foam 200 in accordance with a first embodiment is described with reference to FIGS. 1 to 5. FIGS. 1 to 3 illustrate a structural example of the hollow blow-molded foam 200. FIGS. 4 and 5 illustrate an example of a method of preparing the hollow blow-molded foam 200.

The hollow blow-molded foam 200 of the present embodiment is generally molded in the following manner. That is, as illustrated in FIG. 4, a foaming resin (corresponding to a foaming parison 13) is sandwiched between molds 12a and 12b, and molded. Next, as illustrated in FIG. 5, a fluid for use in cooling the hollow blow-molded foam 200 is allowed to flow through a ventilation path 205 to cool the hollow blow-molded foam 200. Thus, as illustrated in FIGS. 1 to 3, a hollow blow-molded foam 200 having a ventilation path 205 is formed.

In this molding method, gentle irregularities 208 are formed on respective inner surfaces (hereinafter, referred to also as "surfaces of the ventilation path 205") of wall parts 201 and 202 (to be described later) that form the ventilation path 205 shown in FIG. 3. Moreover, in the hollow blow-molded foam 200 having such irregularities 208, a fluid (not shown) is allowed to easily flow through the ventilation path 205. That is, as illustrated in FIG. 3, when the direction of the fluid flows is defined as an arrow A (that is, flow path direction A), the fluid more easily flows in the flow path direction A in comparison with the reversed direction to the flow path. As a result, it is possible to improve the flow-rate efficiency of the fluid to pass through the ventilation path 205 of the hollow blow-molded foam 200. Now, the hollow blow-molded foam 200 is described in more detail with reference to the attached drawings.

Structural Example of Hollow Blow-Molded Foam 200

First, a structural example of the hollow blow-molded foam 200 of the present embodiment is described with reference to FIGS. 1 and 2. FIG. 1 is a perspective view that illustrates a structural example of the hollow blow-molded foam 200. FIG. 2 is a cross-sectional view taken along line X-X' of FIG. 1.

The hollow blow-molded foam 200 is a light-weighted one for use in transfer of a cooled/warmed wind to desired portions. Such a wind is supplied from, for example, an air conditioner unit. In addition, the hollow blow-molded foam 200 is molded by blow-molding a thermoplastic resin mixed with a foaming agent.

The hollow blow-molded foam 200 of the present embodiment is provided with wall parts (first wall part 201 and second wall part 202) in a foamed state. These wall surfaces have a closed cell structure (70% or more of closed cell rate) with a plurality of cells (having an expansion ratio of 2.5 folds or more). Moreover, as illustrated in FIG. 3, the hollow blow-molded foam 200 has parting lines 203.

As illustrated in FIG. 2, the hollow blow-molded foam 200 of the present embodiment has the ventilation path 205 formed inside thereof, an inlet 206, and an outlet 207. The inlet 206 serves as one of opening ends of the ventilation path 205, and the outlet 207 serves as the other opening end of the ventilation path 205. The supply inlet 206 is located at a leading end in the longitudinal direction of the hollow blow-molded foam 200 that is connected to an air conditioner unit (not shown). Therefore, a cooled/warmed wind of the air conditioner unit is supplied into the ventilation path 205 inside the hollow blow-molded foam 200 through the supply inlet 206. Moreover, the outlet 207 is located at a rear end in the longitudinal direction of the hollow blow-molded foam 200. Through the outlet 207, the cooled/warmed wind directed into the ventilation path 205 inside the hollow blow-molded foam 200 is discharged toward the outside. Not limited to the shape and structure shown in FIGS. 1 and 2, the shape and structure of the hollow blow-molded foam 200 of the present embodiment may be desirably altered in designing.

The wall parts (first wall part 201 and second wall part 202) of the hollow blow-molded foam 200 of the present embodiment preferably have an average thickness of 2.0 mm or more, more preferably, 3.0 mm or more. In this case, the average cell diameter of cells is preferably less than 300 μm, more preferably, less than 100 μm in the thickness direction of the first wall part 201 and the second wall part 202.

A material for the hollow blow-molded foam 200 of the present embodiment may be a polypropylene resin. Preferably, this material may be a blended resin formed by blending 1 to 20 wt % of polyethylene resin and/or 5 to 40 wt % of hydrogenated styrene thermoplastic elastomer in a polypropylene resin. This material has a tensile fracture elongation of 40% or more at −10° C. and a tensile elastic modulus of 1000 kg/cm² or more at normal temperature. More preferably, this material has a tensile fracture elongation of 100% or more at −10° C. The following description will discuss definitions on the expansion ratio and tensile elastic modulus.

Expansion ratio: A value, obtained by dividing the density of a thermoplastic resin used in a preparation method of the present embodiment, which will be described later by an apparent density of the wall part (first wall part 201 and second wall part 202) of the hollow blow-molded foam 200 obtained by the preparation method of the present embodiment, is defined as the expansion ratio.

Tensile fracture elongation: A portion of the wall surface of the hollow blow-molded foam 200 (first wall part 201 and second wall part 202) obtained by a preparation method of the present embodiment to be described later was cut out, and stored at −10° C. Thereafter, No. 2-type test pieces, defined in JISK-7113, were formed at normal temperature (23° C.). The tensile elastic modulus of these test pieces was measured at an extension speed of 50 mm/min.

As described earlier, the hollow blow-molded foam 200 of the present embodiment has the ventilation path 205 defined by the first wall part 201 and the second wall part 202 (see FIG. 2). Moreover, irregularities 208 are formed on the surface of the ventilation path 205 (see FIG. 3). Here, FIG. 3 is a view that shows a state of the inside of the hollow blow-molded foam 200 shown in FIG. 1. This Figure only shows the second wall part 202, with the first wall part 201 being removed.

In the hollow blow-molded foam 200 of the present embodiment, the irregularities 208 on the surface of the ventilation path 205 are gentle so that the fluid is allowed to easily flow in a flow path direction A. For this reason, upon application of the hollow blow-molded foam 200 shown in FIG. 1 as a duct, a resistance, exerted against a fluid such as a cooled/warmed wind to be supplied to the ventilation path 205 through the inlet 206 from an air conditioner unit or the like, is reduced. As a result, the flow rate efficiency of the fluid can be improved.

Example of Preparation Method of Hollow Blow-Molded Foam 200

A method for preparing the hollow blow-molded foam 200 of the present embodiment is described with reference to FIGS. 4 and 5.

First, as illustrated in FIG. 4, a foaming parison 13 is injected into a cylindrical shape from an annular die 11, and the injected foaming parison 13 is placed between a pair of split mold blocks 12a and 12b.

Next, as illustrated in FIG. 5, by clamping the split mold blocks 12a and 12b, the foaming parison 13 is sandwiched between the split mold blocks 12a and 12b. Thus, the foaming parison 13 is housed in a space formed by a cavity 10a of the split mold block 12a and a cavity 10b of the split mold block 12b.

Next, a blow-molding process is carried out at a predetermined blowing pressure. That is, as illustrated in FIG. 5, the split mold blocks 12a and 12b are mold-clamped. In this state, a blow-in needle 14 and a blow-out needle 15 are simultaneously stuck into the foaming parison 13. A compressed gas such as air is blown into the foaming parison 13 from the blow-in needle 14. The compressed gas is blown out from the blow-out needle 15 after passing through the inside of the foaming parison 13.

The portion at which the blow-in needle 14 is stuck is the inlet 206 side of the hollow blow-molded foam 200 shown in FIG. 1. This portion forms a blow-in opening for use in blowing the compressed gas into the foaming parison 13. Moreover, the portion at which the blow-out needle 15 is stuck is the outlet 207 side of the hollow blow-molded foam 200. This portion forms a blow-out opening for use in externally discharging the compressed gas from the inside of the foaming parison 13. Thus, the compressed gas is blown into the foaming parison 13 from the blow-in needle 14, and the compressed gas is blown out from the blow-out needle 15 after passing through the inside of the foaming parison 13. As a result, a blow molding process is carried out at a predetermined blowing rate.

The blowing pressure is given as a differential pressure between the pressure of a regulator 16 and that of a backpressure regulator 17. The blowing pressure is obtained by setting the regulator 16 and the backpressure regulator 17 to respectively predetermined pressures, with the split mold block 12a and split mold block 12b being tightly closed. The blow-molding process is carried out by using a predetermined blowing pressure. For example, a compressed gas having a predetermined pressure is blown into the foaming parison 13 from the blow-in needle 14 for a predetermined period of time. Thus, the pressure inside the foaming parison 13 (inner pressure) is changed from the atmospheric pressure to a predetermined pressure.

The blowing pressure is set to 0.5 to 3.0 kg/cm², preferably, to 0.5 to 1.0 kg/cm². In the case when the blowing pressure is set to 3.0 kg/cm² or more, the thickness of the hollow blow-molding foam is lowered, or the reduction of the expansion ratio is easily caused. In contrast, in the case when the blowing pressure is set to 0.5 kg/cm² or less, it becomes difficult to control the differential pressure between the regulator 16 and the backpressure regulator 17. Moreover, it becomes difficult to deform the surface shape of the ventilation path 205 inside the hollow blow-molded foam 200 along the flow path direction A of the compressed air blown into the foaming parison 13. For this reason, the blowing pressure is set to 0.5 to 3.0 kg/cm², preferably, to 0.5 to 1.0 kg/cm².

Moreover, when the blow-molding process is carried out at a predetermined blowing pressure, a temperature-adjusting equipment may be installed. By using this temperature-adjusting equipment, the compressed gas to be supplied into the foaming parison 13 from the blow-in needle 14 can also be heated to a predetermined temperature. Thus, the compressed gas supplied into the foaming parison 13 is allowed to have a predetermined temperature. Consequently, a foaming agent contained in the foaming parison 13 can be easily foamed. In this case, the predetermined temperature is preferably determined at a temperature suitable for allowing the foaming agent to be expanded.

Alternatively, the supply of the compressed gas into the foaming parison 13 from the blow-in needle 14 may be carried out at room temperature. In this case, the temperature-adjusting equipment for use in adjusting the temperature of the compressed gas needs not be required. Therefore, the hollow blow-molded foam 200 can be produced at low costs. Moreover, after the blow-molding process, the hollow blow-molded foam 200 is cooled down. By carrying out the blow-molding process at room temperature, it is possible to shorten the cooling time of the hollow blow-molded foam 200 after the blow-molding process.

In the present embodiment, simultaneously as the compressed gas is blown into the foaming parison 13 from the blow-in needle 14, an exhausting process is carried out from the cavity 10a of the split mold block 12a and the cavity 10b of the split mold block 12b. As a result, no gap exists between the foaming parison 13 and the cavity 10a as well as between it and the cavity 10b so that a negative pressure state is formed. Thus, a pressure difference is caused between the inside and the outside of the foaming parison 13 housed in the cavity 10a of the split mold block 12a and the cavity 10b of the split mold block 12a (with the inside of the foaming parison 13 having a higher pressure than the outside thereof). The foaming parison 13 is pressed onto the wall surfaces of the cavity 10a and the cavity 10b so that a hollow blow-molded foam 200 having a ventilation path 205 formed therein is molded.

Additionally, in the above-mentioned preparation processes, the process for blowing the compressed gas into the foaming parison 13 and the process for generating a negative pressure on the outside of the foaming parison 13 are not necessarily carried out at the same time. These processes may be carried out with a time gap. Moreover, only one of the above-mentioned processes may be carried out, with the foaming parison 13 being pressed onto wall surfaces of the cavities 10a and 10b of the split mold blocks 12a and 12b, so that a hollow blow-molded foam 200 having a ventilation path 205 can be molded.

Next, a compressed gas such as air is blown to the inside of the foaming parison 13 through the blow-in needle 14. On the other hand, the compressed gas after passing through the inside of the foaming parison 13 is blown out from the blow-out needle 15. As a result, the hollow blow-molded foam 200 is cooled at a predetermined blowing pressure.

Upon cooling the hollow blow-molded foam 200, the temperature of the compressed gas to be supplied to the foaming parison 13 from the blow-in needle 14 is preferably set from 10° C. to 30° C., more preferably, at room temperature (for example, 23° C. In the case when the temperature of the compressed gas is set at room temperature, the temperature-adjusting equipment for use in adjusting the temperature of the compressed gas needs not be required. Therefore, the hollow blow-molded foam 200 can be produced at low costs. Moreover, in the case when a temperature-adjusting equipment is prepared so as to make the temperature of the compressed gas to be supplied into the foaming parison 13 from the blow-in needle 14 lower than room temperature, the cooling time of the hollow blow-molded foam 200 can be shortened. Additionally, the cooling process is preferably carried out in 30 seconds to 80 seconds, although it depends on the temperature of the compressed gas.

With this arrangement, it is possible to prepare a hollow blow-molded foam 200 having a ventilation path 205 and gentle irregularities 208 formed on the surfaces of the ventilation path 205. Moreover, the hollow blow-molded foam 200 thus produced has a ventilation path 205 through which a fluid is allowed to easily flow in the flow path direction A in comparison with the reversed direction to the flow path.

Moreover, in the above-mentioned preparation method, the blow-in needle 14 is positioned on the upper side of the foaming parison 13, with the blow-out needle 15 being positioned on the lower side of the foaming parison 13, so that the compressed gas is allowed to flow in a gravity direction. Thus, it is possible to easily form a hollow blow-molded foam 200 having a ventilation path through which a fluid is allowed to easily flow in the flow path direction A.

Additionally, as the foaming agent that is applicable upon molding the hollow blow-molded foam 200 of the present embodiment, for example, physical foaming agents, chemical foaming agents and mixtures thereof may be used. As the physical foaming agent, inorganic physical foaming agents, such as air, carbon dioxide gas, nitrogen gas, water and the like, and organic physical foaming agents, such as butane, pentane, hexane, dichloromethane, dichloroethane and the like, and ultracritical fluids thereof are proposed. The ultracritical fluid is preferably formed by using, for example, carbondioxide or nitrogen. In the case of using nitrogen, the ultracritical fluid is preferably formed under conditions of a critical temperature of $-149.1°$ C. and a critical pressure of 3.4 MPa or more. In the case of using carbon dioxide, the ultracritical fluid is preferably formed under conditions of a critical temperature of 31° C. and a critical pressure of 7.4 MPa or more.

Moreover, the polypropylene resin applicable to mold the hollow blow-molded foam 200 of the present embodiment is preferably prepared as polypropylene whose melt tension is located within 30 to 350 mN at 230° C. In particular, the polypropylene resin is preferably prepared as a polypropylene single polymer having a long-chain branched structure, and to which an ethylene-propylene block copolymer is further preferably added.

Moreover, to the polypropylene resin, a hydrogenated styrene thermoplastic elastomer may be further added. In this case, in order to improve the impact resistance and also to maintain the rigidity as a hollow blow-molded foam 200, the hydrogenated styrene thermoplastic elastomer is added in a range from 5 to 40 wt %, preferably, from 15 to 30 wt %, relative to the polypropylene resin.

More specifically, examples of the hydrogenated styrene thermoplastic elastomer used include hydrogenated polymers, such as a styrene-butadiene-styrene block copolymer, a styrene-isoprene-styrene block copolymer, and a styrene-butadiene random copolymer. Moreover, in the case of using the hydrogenated styrene thermoplastic elastomer, the styrene content is set to less than 30 wt %, preferably, to 20 wt % or more. The hydrogenated styrene thermoplastic elastomer has an MFR at 230° C. (measured at a test temperature of 230° C., with a test load of 2.16 kg in accordance with JIS K-7210) of 10 g/10 minutes or less, preferably 5.0 g/10 minutes or less, and 1.0 g/10 minutes or more.

Moreover, a polyolefin polymer to be added to the polypropylene resin is preferably a low-density ethylene-α-olefin. In this case, the compounding ratio of the low-density ethylene-α-olefin is in a range from 1 to 20 wt %. The low-density ethylene-α-olefin preferably has a density of 0.91 $g/cm^3$ or less. Examples of preferable low-density ethylene-α-olefin include an ethylene-α-olefin copolymer obtained by co-polymerizing ethylene and α-olefin having carbon atoms of 3 to 20. Examples thereof include propylene, 1-butene, 1-pentene, 1-hexene, 1-butene, 1-octene, 1-nonene, 1-decene, 1-dodecene, 4-methyl-1-pentene, and 4-methyl-1-xene. Among them, 1-butene, 1-hexene, and 1-octene are preferred. Moreover, the α-olefin having carbon atoms of 3 to 20 may be used alone, or two or more kinds of them may be used in combination. The content of ethylene monomer units in the ethylene-α-olefin copolymer is in a range from 50 to 99 wt % relative to the ethylene-α-olefin copolymer. Moreover, the content of α-olefin monomer units is in a range from 1 to 50 wt % relative to the ethylene-α-olefin copolymer. In particular, a straight-chain ultra-low density polyethylene polymerized by using a metallocene catalyst, or an ethylene elastomer, or a propylene elastomer is preferably used.

Moreover, in order to improve the heat insulating performance of the hollow blow-molded foam 200, the thickness of the hollow blow-molded foam 200 is preferably made thicker. By making the thickness of the hollow blow-molded foam 200 thicker, the surface of the ventilation path 205 of the hollow blow-molded foam 200 becomes easily subjected to resistance of a compressed gas blown into the hollow blow-molded foam 200. For this reason, it is possible to easily mold a hollow blow-molded foam 200 having surfaces of the ventilation path 205 that allow the fluid to easily flow in the flow path direction A, and have gentle irregularities 208. The thickness of the hollow blow-molded foam 200 is set to 2.0 mm or more, preferably, to 3.0 mm or more. Moreover, the foaming parison 13 serving as a molding material for the hollow blow-molded foam 200 preferably has an MFR of 1 g/10 minutes or more at 200° C., and an MT of 6 cN or more at 200° C., with its value of MFR×MT being preferably set to 13 or more.

<Functions and Effects of Hollow Blow-Molded Foam 200 of the Present Embodiment>

As described above, the hollow blow-molded foam 200 of the present embodiment is obtained by processes for sandwiching the foaming parison 13 between the molds 12a and 12b, for allowing a compressed gas to flow into the foaming parison 13 so as to set the inner pressure of the foaming parison 13 greater than the atmospheric pressure, and for molding the hollow blow-molded foam 200 as well as cooling the hollow blow-molded foam 200. At this time, the compressed gas is allowed to flow in the flow path direction A. Here, the flow path direction A corresponds to a direction in which a fluid flows through the ventilation path 205 when the hollow blow-molded foam 200 is used as a duct.

With this arrangement, it is possible to produce a hollow blow-molded foam 200 having the ventilation path 205 and gentle irregularities 208 formed on the surface of the ventilation path 205. Moreover, the hollow blow-molded foam 200 thus produced has the ventilation path 205 that allows a fluid to easily flow in the flow path direction A rather than in the reversed direction to the flow path. As a result, the flow-rate efficiency of a fluid to flow through the inside of the hollow blow-molded foam 200 can be improved.

Moreover, as carried out in the present embodiment, by simultaneously performing a blowing process for molding the hollow blow-molded foam 200 and a blowing process for cooling the hollow blow-molded foam 200, the production cycle of the hollow blow-molded foam 200 can be shortened.

In the above-mentioned preparation method, the blow-in needle 14 and the blow-out needle 15 are simultaneously stuck into the foaming parison 13. However, it is not necessary to simultaneously stick the blow-in needle 14 and the blow-out needle 15 into the foaming parison 13. For example, after the blow-in needle 14 has been preliminarily stuck into the foaming parison 13, the blow-out needle 15 may be stuck into the foaming parison 13.

Figure 6:
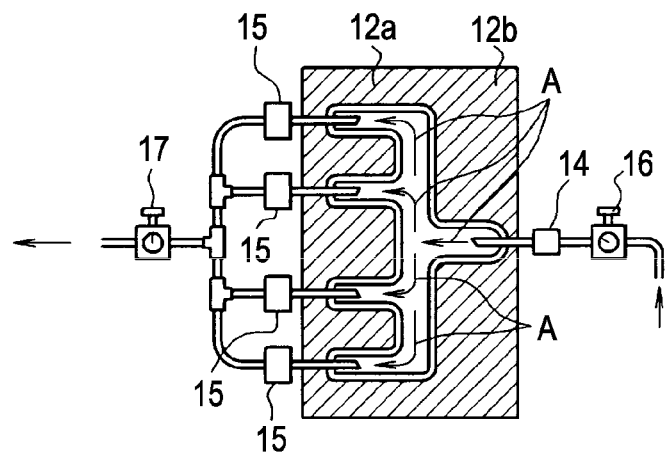
FIG. 6 is a view that explains one example of a method for preparing a hollow blow-molded foam in accordance with a second embodiment.

Moreover, in the above-mentioned embodiment, as illustrated in FIGS. 4 and 5, an explanation has been given by exemplifying a structure in which the hollow blow-molded foam 200 is not branched. However, as illustrated in FIG. 6, the hollow blow-molded foam 200 may be branched into two or more crotches. In an attempt to prepare such a hollow blow-molded foam 200, as illustrated in FIG. 6, a blow-out needle 15 is placed in each of branches. A compressed gas is blown into the foaming parison 13 from a single blow-in needle 14. The compressed gas is allowed to pass through the inside of the foaming parison 13 to be blown out from the blow-out needle 15 placed in each of the branches. As a result, the hollow blow-molded foam 200 is cooled by a predetermined blowing pressure. With this arrangement, the compressed gas can be transmitted to a ventilation path 205 for each of the branches. Thus, the hollow blow-molded foam 200 can be easily cooled, and simultaneously, the irregularities 208 on the surface of the ventilation path 205 of each branch can be made gentler. Moreover, the surface of the ventilation path 205 of each branch can be formed into a shape that allows a fluid to more easily flow in the flow path direction A.

In the above-mentioned embodiment, by blowing a compressed gas into the foaming parison 13 through the blow-in needle 14, with the compressed air being blown out from the blow-out needle 15, the hollow blow-molded foam 200 is cooled. However, the fluid is not intended to be limited by a compressed gas such as air. For example, a compressed gas (mist air) formed by atomizing a cooling medium such as water into a mist state may be used. In this case also, the mist air can be blown into the foaming parison 13 through the blow-in needle 14. With this arrangement, the hollow blow-molded foam 200 can be easily cooled, and the irregularities 208 on the surface of the ventilation path 205 of the hollow blow-molded foam 200 can be made gentler. Moreover, by the blowing process of the mist air, the surface of the ventilation path 205 can be formed into a shape that allows a fluid to more easily flow in the flow path direction A. That is, when mist air is blown into the foaming parison 13, the irregularities 208 on the surface of the ventilation path 205 of the hollow blow-molded foam 200 can be made gentler by a resistance of the mist air. Moreover, by the resistance of the mist air, the surface of the ventilation path 205 can be formed into a shape that allows a fluid to more easily flow in the flow path direction A.

In the above-mentioned embodiment, the foaming parison 13 is formed by a material in which a foaming agent is uniformly mixed. However, the foaming parison 13 may be formed into a multilayer structure having two or more layers. In this case, a foaming agent may be contained at least in the innermost layer.

Moreover, in the above-mentioned embodiment, a compressed gas is blown into the foaming parison 13 from the blow-in needle 14, with the split mold blocks 12a and 12b being mold-clamped (tightly closed). The compressed gas is allowed to pass through the inside of the foaming parison 13, and then blown from the blow-out needle 15. With this arrangement, the blowing pressure can be set to a predetermined value. In this case, upon setting a differential pressure between the regulator 16 and the backpressure regulator 17, the regulator 16 and the backpressure regulator 17 may be connected with a tube. Thereafter, the compressed gas is blown into the foaming parison 13 through the blow-in needle 14. The compressed gas is allowed to pass through the inside of the foaming parison 13, and then blown from the blow-out needle 15. With this arrangement, the blowing pressure can be set to a predetermined value. In the case when the differential pressure between the regulator 16 and the backpressure regulator 17 is adjusted, with the split mold blocks 12a and 12b being mold-clamped (tightly closed), the compressed gas tends to leak through a gap between the split mold blocks 12a and 12b. In this case, it becomes difficult to maintain the predetermined blowing pressure. For this reason, the regulator 16 and the backpressure regulator 17 are connected with a tube. Thereafter, the compressed gas is blown into the foaming parison 13 through the blow-in needle 14. The compressed gas is allowed to pass through the inside of the foaming parison 13, and then blown from the blow-out needle 15. Thus, it becomes possible to set the blowing pressure to a predetermined value.

In a first embodiment, a compressed gas is blown into the foaming parison 13 through the blow-in needle 14, with the split mold blocks 12a and 12b being mold-clamped (tightly closed), so that a blow-molding process is carried out, with the inner pressure of the foaming parison increased to not less than the atmospheric pressure.

In an alternative embodiment, a reduced-pressure molding process is carried out in which a suction operation is carried out from a cavity 10a of the split mold block 12a and a cavity 10b of the split mold block 12b, with the split mold block 12a and the split mold block 12b being mold-clamped (tightly closed). In this case, the foaming parison 13 is sucked to adhere to the wall surfaces of the cavities 10a and 10b so that a hollow blow-molded foam 200 having a ventilation path 205 is molded.

Next, a compressed gas such as air is blown into the foaming parison 13 through the blow-in needle 14. The compressed gas is allowed to pass through the inside of the foaming parison 13, and blown out of the blow-out needle 15. Thus, the hollow blow-molded foam 200 is cooled at a predetermined blowing pressure. As the cooling method, the same methods as those of the first embodiment may be applied.

With this arrangement, it is possible to manufacture a hollow blow-molded foam 200 having a ventilation path 205 and gentle irregularities 208 formed on the surfaces of its ventilation path 205. Moreover, the hollow blow-molded foam 200 thus produced has the ventilation path 205 that allows a fluid to easily flow in the flow path direction A rather than in the reversed direction to the flow path.

Functions and Effects of Hollow Blow-Molded Foam 200 of the Present Embodiment

As described above, the hollow blow-molded foam 200 of the present embodiment is formed by carrying out a reduced-pressure molding process, with the foaming parison 13 being sandwiched between the molds 12a and 12b; thus, the hollow blow-molded foam 200 thus molded is allowed to have a ventilation path 205. Thereafter, the hollow blow-molded foam 200 is used as a duct. At this time, the compressed gas for use in cooling the hollow blow-molded foam 200 is directed into the ventilation path 205 in the same flow path direction A in which a fluid is allowed to pass through the ventilation path 205. Here, the flow path direction A corresponds to a direction in which a fluid flows through the ventilation path 205. Thus, the hollow blow-molded foam 200 is cooled.

With this arrangement, it is possible to produce a hollow blow-molded foam 200 having the ventilation path 205 and gentle irregularities 208 formed on the surface of the ventilation path 205. Moreover, the hollow blow-molded foam 200 thus produced has the ventilation path 205 that allows a fluid to easily flow in the flow path direction rather than in the reversed direction to the flow path. As a result, the flow-rate efficiency of a fluid to flow through the inside of the hollow blow-molded foam 200 can be improved.

In the first and second embodiments, a hollow blow-molded foam 200 is molded by using a foaming parison 13. In another alternative embodiment, the hollow blow-molded foam 200 is molded by using a thermoplastic resin sheet. Now, the hollow blow-molded foam 200 of the present embodiment is described with reference to FIG. 7.

Method for Preparing Hollow Blow-Molded Foam 200

Figure 7:
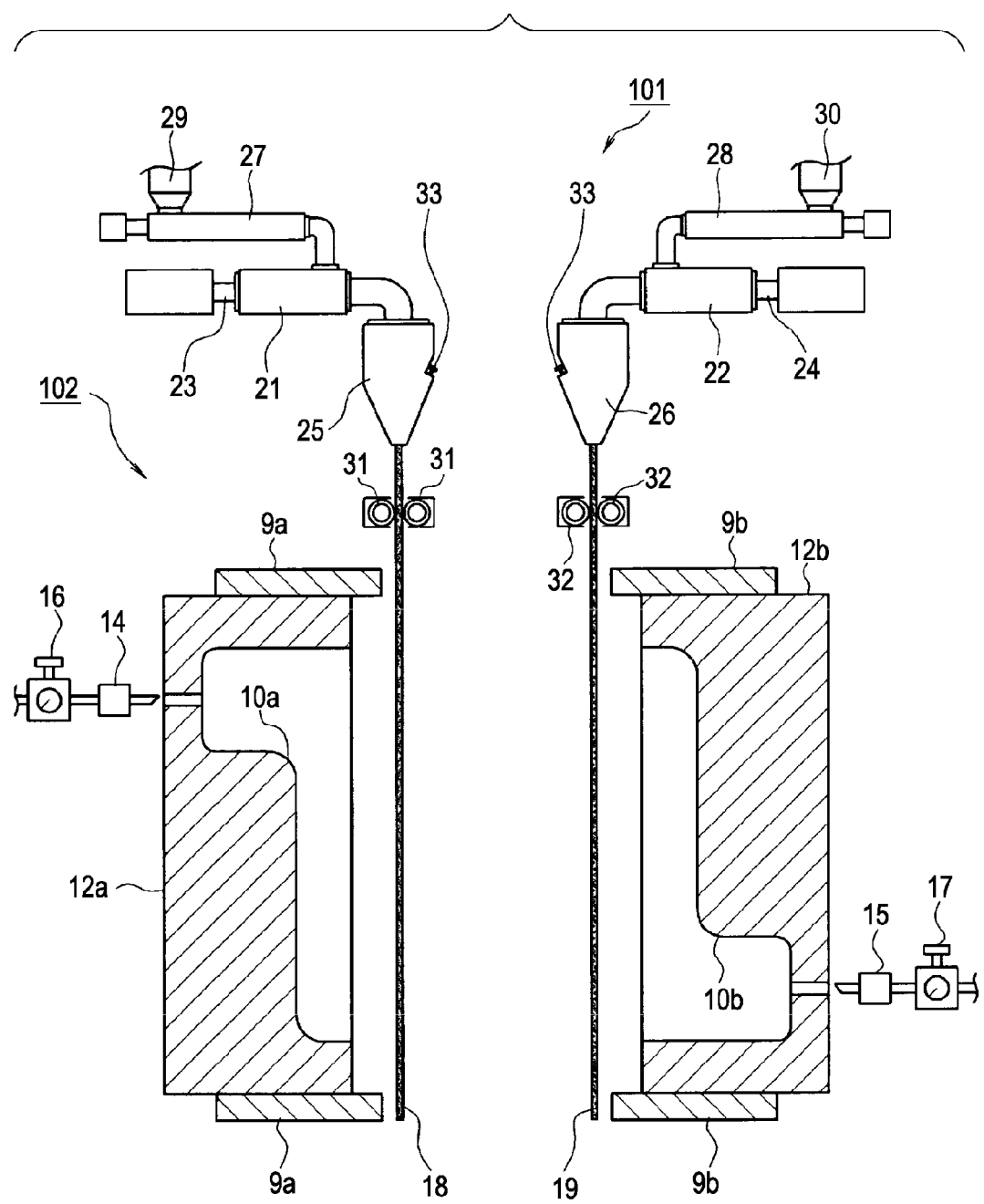
FIG. 7 is a view that explains one example of a method for preparing a hollow blow-molded foam 200 in accordance with a third embodiment.

A method for preparing a hollow blow-molded foam 200 of the present embodiment is described with reference to FIG. 7. Here, FIG. 7 is a view that shows a structural example of a molding apparatus to be used for molding the hollow blow-molded foam 200 of the present embodiment.

The molding apparatus for use in molding the hollow blow-molded foam 200 of the present embodiment is provided with an extruder 101 and a mold-clamping device 102. The extruder 101 extrudes thermoplastic resin sheets 18 and 19 in a molten state into the mold-clamping device 102. The mold-clamping device 102 mold-clamps the thermoplastic resin sheets 18 and 19 so that a hollow blow-molded foam 200 as illustrated in FIG. 1 is molded.

The extruder 101 is provided with a first accumulator 21, a second accumulator 22, a first plunger 23, a second plunger 24, a first T-die 25, a second T-die 26, a first extruding machine 27, a second extruding machine 28, a first thermoplastic resin supply hopper 29, a second thermoplastic resin supply hopper 30, a first pair of rollers 31, and a second pair of rollers 32.

The mold-clamping device 102 is provided with split mold blocks 12a and 12b and mold frames 9a and 9b. The mold frames 9a and 9b are respectively positioned on the outer circumferential portions of the split mold blocks 12a and 12b. The split mold blocks 12a and 12b respectively have cavities 10a and 10b.

First, as illustrated in FIG. 7, the first thermoplastic resin sheet 18 (thermoplastic resin sheet with cells, kept in a molten state) for use in forming a first wall portion 201 is extruded from the first T-die 25 so that the first thermoplastic resin sheet 18 is suspended between the pair of split mold blocks 12a and 12b.

Moreover, as illustrated in FIG. 7, the second thermoplastic resin sheet 19 (thermoplastic resin sheet with cells, kept in a molten state) for use in forming a second wall portion 202 is extruded from the second T-die 26 so that the second thermoplastic resin sheet 19 is suspended between the pair of split mold blocks 12a and 12b.

Next, the mold frames 9a and 9b as well as the paired split mold blocks 12a and 12b are allowed to proceed in horizontal directions. Thus, the mold frames 9a and 9b, located on the outer circumferential portions of the paired split mold blocks 12a and 12b, are made tightly in contact with the first thermoplastic resin sheet 18 and the second thermoplastic resin sheet 19. Thus, the first thermoplastic resin sheet 18 and the second thermoplastic resin sheet 19 are held by the mold frames 9a and 9b. Next, with the first thermoplastic resin sheet 18 and the second thermoplastic resin sheet 19 being held by the mold frames 9a and 9b, the paired split mold blocks 12a and 12b are allowed to proceed in horizontal directions. Moreover, the first thermoplastic resin sheet 18 and the second thermoplastic resin sheet 19 are respectively vacuum-sucked into the cavities 10a and 10b of the paired split mold blocks 12a and 12b. Thus, the first thermoplastic resin sheet 18 and the second thermoplastic resin sheet 19 are formed into shapes corresponding to the cavities 10a and 10b.

Next, the mold frames 9a and 9b as well as the paired split mold blocks 12a and 12b are allowed to proceed in horizontal directions. The mold frames 9a and 9b as well as the paired split mold blocks 12a and 12b are closed and mold-clamped. Thus, the paired split mold blocks 12a and 12b are made in contact with each other so that the first thermoplastic resin sheet 18 and the second thermoplastic resin sheet 19 are joined to fusion-adhere to each other. As a result, a parting line 203 is formed on the joined surface between the first thermoplastic resin sheet 18 and the second thermoplastic resin sheet 19 so that a hollow blow-molded foam 200 having a ventilation path 205 is molded.

Next, the hollow blow-molded foam 200 is cooled inside the paired split mold blocks 12a and 12b. At this time, a blow-in needle 14 and a blow-out needle 15 are stuck into the thermoplastic resin sheets 18 and 19. Then, a compressed gas such as air is blown into the thermoplastic resin sheets 18 and 19 through the blow-in needle 14. The compressed gas is allowed to pass through the inside of each of the thermoplastic resin sheets 18 and 19, and blown out of the blow-out needle 15. Thus, the hollow blow-molded foam 200 is cooled. As the cooling method, the same methods as those of the first embodiment may be applied. With this arrangement, the hollow blow-molded foam 200 can be easily cooled, and the irregularities 208 on the surfaces of the ventilation path 205 can be made gentler. Moreover, the surfaces of the ventilation path 205 can be formed into shapes that allow a fluid to easily flow in the flow path direction A.

Next, the mold frames 9a and 9b as well as the paired split mold blocks 12a and 12b are allowed to retreat in horizontal directions. Thus, the mold frames 9a and 9b as well as the paired molded blocks 12a and 12b are separated from the hollow blow-molded foam 200.

Additionally, with respect to the thickness of each of the thermoplastic resin sheets 18 and 19 suspended between the paired split mold blocks 12a and 12b, the extruding rate and the thickness distribution in the extruding direction thereof, these factors may be individually adjusted so as to prevent occurrence of deviations in thickness due to draw down, neck-in, etc.

The first thermoplastic resin sheet 18 is formed by the following processes. A thermoplastic resin to which a foaming agent has been added is fused and kneaded by the first extruder 27. Thereafter, the thermoplastic resin is temporarily stored in an accumulator chamber of the first accumulator 21. The thermoplastic resin is supplied to the first T-die 25 by the first plunger 23 for every constant time intervals.

Moreover, the second thermoplastic resin sheet 19 is formed in the same manner as in the first thermoplastic resin sheet 18. A thermoplastic resin to which a foaming agent has been added is fused and kneaded by the second extruder 28. Thereafter, the thermoplastic resin is temporarily stored in an accumulator chamber of the second accumulator 22. The thermoplastic resin is supplied to the second T-die 26 by the second plunger 24 for every constant time intervals.

The first thermoplastic resin sheet 18, extruded by the first T-die 25, is sandwiched and pressed between first paired rollers 31 to be disposed between the paired split mold blocks 12a and 12b. Moreover, the second thermoplastic resin sheet 19, extruded by the second T-die 26, is sandwiched and pressed between second paired rollers 32 to be disposed between the paired split mold blocks 12a and 12b. At this time, the thickness, thickness distribution, etc. of the first thermoplastic resin sheet 18 and the second thermoplastic resin sheet 19 are individually adjusted.

More specifically, first, the extruding rate of each of the first thermoplastic resin sheet 18 and the second thermoplastic resin sheet 19 is individually set by each of the first accumulator 21 and the second accumulator 22, as well as each of the first T-die 25 and the second T-die 26.

The extruding capability of each of the first extruder 27 and the second extruder 28 respectively connected to the first accumulator 21 and the second accumulator 22 can be selected on demand, according to the size of a hollow blow-molded foam 200 to be finally molded. However, the extruding capability of each of the first extruder 27 and the second extruder 28 is preferably set to not less than 50 kg/hour. Thus, it becomes possible shorten the molding cycle of a hollow blow-molded foam 200.

From the viewpoint of preventing occurrence of draw down, the extruding process of the first thermoplastic resin sheet 18 from the first T-die 25 needs to be completed within 40 seconds, more preferably, within 30 seconds. In the same manner, the extruding process of the second thermoplastic resin sheet 19 from the second T-die 26 needs to be completed within 40 seconds, more preferably, within 30 seconds.

For this reason, the thermoplastic resin, stored in the accumulator chamber of the first accumulator 21 and the accumulator chamber of the second accumulator 22, is extruded from a slit aperture of each of the first T-die 25 and the second T-die 26 at a rate of 50 kg/hour or more per 1 $cm^2$, more preferably, at a rate of 60 kg/hour or more per 1 $cm^2$. In this case, by changing the slit gap of each of the first T-die 25 and the second T-die 26 in accordance with each of the extrusions of the thermoplastic resin sheet 18 and 19, it is possible to suppress the influence of draw down to a minimum.

In other words, the thickness on the upper side of each of the thermoplastic resin sheets 18 and 19 is expanded by its self-weight due to a draw down phenomenon, with the result that the thickness tends to be reduced. For this reason, the slit gap of each of the first T-die 25 and the second T-die 26 is gradually widened from the start of the resin sheet extrusion so that the slit gap can be widened in accordance with the upper portion of each of the thermoplastic resin sheets 18 and 19. Thus, the thickness of each of the thermoplastic resin sheets 18 and 19 can be adjusted uniformly from the upper portion to the lower portion.

Moreover, the rotation speed of the first paired rollers 31 and the second paired rollers 32 may be changed relative to the extruding speed of the thermoplastic resin sheets 18 and 19 respectively extruded from the first T-die 25 and second T-die 26. With this arrangement, the extruding speed of the thermoplastic resin sheets 18 and 19 to be extruded from the first T-die 25 and second T-die 26 may be different from the feeding speed of the thermoplastic resin sheets 18 and 19 exerted by the first paired rollers 31 and the second paired rollers 32. With this arrangement, the thermoplastic resin sheets 18 and 19 can be extended from the first T-die 25 and the second T-die 26 to the first paired rollers 31 as well as to the second paired rollers 32. As a result, the thickness of each resin sheet can be adjusted and made thinner.

The thermoplastic resin supplied to each of the first T-die 25 and the second T-die 26 is extruded from a slit of each of the T-die main bodies as a resin sheet through a resin flow path from the manifold (not shown) from each of the T-die main body. Each of the T-die main bodies is constituted by superposing one die onto the other die. At the leading portion of each of the T-die main bodies, one of die lips and the other die lip are made face to face with each other with a slit gap. This slit gap is determined by a slit-gap adjusting device 33.

The thickness of the resin sheet to be extruded from each of the first T-die 25 and the second T-die 26 is determined by the slit gap. The slit gas is adjusted by a known slit gap adjusting device 33. By adjusting the slit gap, the uniformity in the width direction of the resin sheet can be adjusted. Moreover, by using a slit-gap driving device (not shown), the other die lip can be changed in a period of time from the start of the extrusion to the completion of the extrusion of the resin sheet that is intermittently extruded. With this arrangement, the thickness of the resin sheet in the extruding direction can be adjusted.

With respect to the slit-gap adjusting device, that of a thermal expansion type and that of a mechanical type are proposed. As the slit-gap adjusting device 33, such a device as to compatibly have both of the functions is preferably used.

Plural slit-gap adjusting devices 33 are disposed along the width direction of the slit with equal intervals. By allowing each of the slit-gap adjusting devices 33 to narrow or widen the corresponding slit gap, the thickness of the resin sheet in the width direction can be made uniform.

Each of the slit-gap adjusting devices 33 is provided with a die bolt that is placed so as to freely advance or retreat to or from the other die lip. An adjusting axis is attached to the tip of the die bolt with a pressure transmitting portion interposed therebetween. An engaging member is coupled to the adjusting axis with a fastening bolt. The engaging member is connected to one of the die lips. When the die bolt is allowed to advance, the adjusting axis is pushed to protrude toward the tip through the pressure transmitting portion. With this arrangement, one of the die lips is pressed. Thus, the die lip is deformed by a portion of a concave groove. For this reason, the slit gap is narrowed. In contrast, in an attempt to widen the slit gap, the die bolt is made to retreat.

Moreover, by using the thermal expansion type adjustment device in combination with the mechanical adjustment device, the slit-gap can be adjusted with high precision. More specifically, by heating the adjusting axis to be thermally expanded by the use of an electric heater, not shown, one of the die lips is pressed. Thus, the slit-gap is narrowed.

Furthermore, in order to widen the slit-gap, the adjusting axis is cooled by a cooling means, not shown, with the electric heater being stopped. Consequently, since the adjusting axis is contracted, the slip-gap can be widened.

At the time when the resin sheet extruded from the first T-die 25 and the second T-die 26 is suspended between the paired split mold block 12a and split mold block 12b, that is, at the time when the split mold block 12a and the split mold block 12b are closed, the thickness in the width direction of the resin sheet has been preferably adjusted to be made uniform. In this case, the slit-gap is gradually widened from the start of extrusion of the resin sheet so as to be varied to the maximum size upon completion of the extrusion of the resin sheet.

With this arrangement, the thickness of the resin sheet to be extruded from the first T-die 25 and the second T-die 26 is gradually made thicker from the start of extrusion of the resin sheet. However, since the resin sheet extruded in its molten state is extended by its self-weight (draw down phenomenon), the thickness of the resin sheet tends to become gradually thinner from below to above. Therefore, the portion whose thickness becomes thicker by widening the slit-gap is cancelled by an extended portion whose thickness becomes thinner due to the draw down phenomenon. Thus, the thickness of the resin sheet can be uniformly adjusted from above to below.

The material for the first thermoplastic resin sheet 18 and the second thermoplastic resin sheet 19 to be suspended between the paired split mold block 12a and split mold block 12b needs have a high melt extension. This makes it possible to prevent occurrence of deviations in thickness due to draw down, neck in, or the like, and also to increase the expansion ratio. For this reason, it is possible to obtain the first wall portion 201 and the second wall portion 202 that are light weight and have a good heat-insulating property.

More specifically, the resin sheet material preferably has an MFR (measured at a testing temperature of 230° C. with a test load of 2.16 kg based upon JISK-7210) of 5.0 g/10 min or less, preferably, in a range from 1.5 to 3.0 g/10 min, at 230° C. Additionally, in general, in order to extrude from a slit of a T-die, with a thin form, a resin material for use in molding a film or the like is designed to have an MFR (measured at a testing temperature of 230° C. with a test load of 2.16 kg based upon JISK-7210) of more than 3.0 g/10 min, more specifically, in a range from 5.0 to 10.0 g/10 min, at 230° C.

The above-mentioned embodiment has exemplified a hollow blow-molded foam 200 that is molded by using two thermoplastic resin sheets 18 and 19. However, the blow-molded foam 200 may be molded by using one thermoplastic resin sheet. In this case, one thermoplastic resin sheet is molded into a U-letter shape. For example, as illustrated in FIG. 3, a hollow blow-molded foam 200 without one of wall surfaces is molded.

Functions and Effects of Hollow Blow-Molded Foam 200 of the Present Embodiment

As described above, in the hollow blow-molded foam 200 of the present embodiment, a hollow blow-molded foam 200 having a ventilation path 205 is formed by sandwiching the thermoplastic resin sheets 18 and 19 between the molds 12a and 12b. When the hollow blow-molded foam 200 is used as a duct, a compressed gas for use in cooling the hollow blow-molded foam 200 is directed into the ventilation path 205 in the same flow path direction A in which a fluid is allowed to pass through the ventilation path 205. Thus, the hollow blow-molded foam 200 is cooled.

With this arrangement, it is possible to produce a hollow blow-molded foam 200 having the ventilation path 205 and gentle irregularities 208 formed on the surface of the ventilation path 205. Moreover, the hollow blow-molded foam 200 thus produced has the ventilation path 205 that allows a fluid to easily flow in the flow path direction rather than in the reversed direction to the flow path. As a result, the flow-rate efficiency of a fluid to flow through the inside of the hollow blow-molded foam 200 can be improved.

The following description will discuss specific examples of the hollow blow-molded foam 200. However, those examples are exemplary only, and the technical idea of the above-mentioned embodiment is not intended to be limited by the examples.

In the present examples, a hollow blow-molded foam 200 is prepared under the following conditions.

Material compounding ratios of foaming parison
WB140/FB3312/FX201 =70 parts/20 parts/10 parts, P0217K: 1 part, 999018: 1 part In this case, WB 140: HMS-PP (High Melt Strength-PP: high melt strength polypropylene) made by Boreales Co., Ltd.

FB3312: HMS-PP made by Japan Polypropylene Corporation

FX201: LLDPE (Linear Low Density Polyethylene) made by Sumitomo Chemical Industries Co.

P0217K: Inorganic foaming agent made by Dainichiseika Color & Chemicals Mfg. Co., Ltd.

999018: Carbon black masterbatch made by Tokyo Printing Ink Mfg. Co., Ltd.

Molten Physical Properties
MFR (230° C.) =6 g/10 min, MT (230° C.) =3.5 cN.

In this case, the value was obtained through measurements after processes in which one portion of a molded product was sampled and left in an oven adjusted to 200° C., with about −0.1 kg/cm$^2$, for 15 minutes.

Additionally, MT corresponds to a tension measured, for example, by using a melt tension tester type-II (in compliance with ASTM1238, made by Toyo Seiki Kosakusho Co., Ltd.) In this measuring method, first, an extruded strand is passed along a pulley of the measurement device and then wound up. At this time, the winding speed is accelerated at $1.3 \times 10^{-2}$ m/sec$^2$, and the number of revolutions Xrpm at the time when the strand is ruptured is measured. At the time of MT measurements, the winding speed is set to X×0.7 rpm, and the average of read values at this time is defined as MT.

Example 1

A foaming parison, adjusted so as to allow a hollow blow-mold foam 200 as a final molded product to have an expansion ratio of 3.0 folds and a thickness of 3.0 mm, was prepared. By using this foaming parison, a blow molding process was carried out. At this time, the slit width upon forming the parison was set to 0.6 mm. Next, a compressed gas was blown into the foaming parison having been subjected to the blow molding process. By these processes, the hollow blow-molded foam 200 was cooled. The hollow blow-molded foam 200 as the final molded product had an expansion ratio of 3.0 folds and a thickness of 3.0 mm. In Example 1, the pressure of the compressed gas blown to the inside thereof was set to 1 kg/cm³. Moreover, in Example 1, only a blow-in opening through which the compressed gas was blown into the foaming parison was prepared. Therefore, the compressed gas was blown out of the blow-in opening (no air circulation).

Example 2

A foaming parison, adjusted so as to allow a hollow blow-mold foam 200 as a final molded product to have an expansion ratio of 3.0 folds and a thickness of 3.0 mm, was prepared. By using this foaming parison, a blow molding process was carried out. At this time, the slit width upon forming the parison was set to 0.6 mm. Next, a compressed gas was blown into the foaming parison having been subjected to the blow molding process through a blow-in needle 14. Then, the compressed gas was blown out from a blow-out needle 15. By these processes, the hollow blow-molded foam 200 was cooled at a predetermined blowing pressure. A hollow blow-molded foam 200 was thus molded. The hollow blow-molded foam 200 as the final molded product had an expansion ratio of 3.0 folds and a thickness of 3.0 mm. In Example 2, the pressure of the compressed gas blown through the blow-in needle 14 was set to 2 kg/cm³. Moreover, the pressure of the compressed gas blown out through the blow-out needle 15 was set to 1 kg/cm³. The differential pressure of the blowing pressure was set to 1 kg/cm³. Moreover, in Example 2, the blow-in opening through which the compressed gas is blown into the foaming parison and the blow-out opening through which the compressed gas is blown out are respectively prepared, with the compressed gas being blown out from the blow-out opening (with air circulation). In this case, in Example 2, the blow-in needle 14 was stuck into a portion of the hollow blow-molded foam 200 shown in FIG. 1 to form an inlet 206 thereof. Thus, the blow-in opening for use in blowing the compressed gas into the foaming parison was formed. Moreover, the blow-out needle 15 was stuck into a portion of the hollow blow-molded foam 200 shown in FIG. 1 to form an outlet 207 thereof. Thus, the blow-out opening for use in blowing the compressed gas from the inside of the foaming parison outward was formed (air circulation direction). Additionally, as the blow-in needle 14, a needle with a diagonally-cut tip as illustrated in FIG. 8A was used. On the other hand, as the blow-out needle 15, a rocket-shaped needle as illustrated in FIG. 8B was used. As illustrated in FIG. 8A, the needle with a diagonally-cut tip has its inserting direction of the needle coincident with the blow-in/blow-out direction. In contrast, as illustrated in FIG. 8B, the rocket-shaped needle has its inserting direction intersecting with the blow-in/blow-out direction. Additionally, in comparison with the rocket-shaped needle, the needle with a diagonally-cut tip is advantageous in that its machining process is comparatively easy. However, in the case when the needle with a diagonally-cut tip is used as the blow-out needle, resin might enter through the tip hole of the needle. As a result, an air blowing-out process sometimes becomes inoperable. Therefore, the rocket-shaped needle as illustrated in FIG. 8(b) is preferably used as the blow-out needle 15.

Example 3

A foaming parison, adjusted so as to allow a hollow blow-mold foam 200 as a final molded product to have an expansion ratio of 3.0 folds and a thickness of 3.0 mm, was prepared, and by using this, a blow molding process was carried out. At this time, the slit width upon forming the parison was set to 0.6 mm. Next, a compressed gas was blown into the foaming parison having been subjected to the blow molding process through a blow-in needle 14. The compressed gas was blown out through a blow-out needle 15 so that the hollow blow-molded foam 200 was cooled at a predetermined blowing pressure. The hollow blow-molded foam 200 as the final molded product had an expansion ratio of 3.0 folds and a thickness of 3.0 mm. In Example 3, the pressure of the compressed gas blown therein through the blow-in needle 14 was set to 2 kg/cm³. Moreover, the pressure of the compressed gas blown out through the blow-out needle 15 was set to 1 kg/cm³. Thus, the differential pressure of the blowing pressure was set to 1 kg/cm³. Moreover, in the same manner as in Example 2, in Example 3, the blow-in opening through which the compressed gas is blown into the foaming parison and the blow-out opening through which the compressed gas is blown out are respectively prepared. Therefore, the compressed gas is blown out from the blow-out opening (with air circulation). In Example 3, the blow-in needle 14 was stuck into a portion on the outlet 207 side of the hollow blow-molded foam 200 shown in FIG. 1. Thus, the blow-in opening for use in blowing the compressed gas into the foaming parison was formed. Moreover, the blow-out needle 15 was stuck into a portion on the inlet 206 side of the hollow blow-molded foam 200 shown in FIG. 1. Thus, the blow-out opening for use in blowing the compressed gas from the inside of the foaming parison 13 to the outside was formed (direction reversed to air circulation direction). In other words, in Example 3, the positional relationship between the blow-in opening and blow-out opening were reversed to that of Example 2.

<Results of Inner Surface Temperature Measurements>

In example 1, the inner surface temperature of the ventilation path 205 of the hollow blow-molded foam 200 was measured with the cooling time being varied at 45 seconds, 60 seconds and 75 second. The results are shown in FIG. 9 (no air circulation as illustrated in FIG. 9). Moreover, in Example 2, the inner surface temperature of the ventilation path 205 of the hollow blow-molded foam 200 was measured with the cooling time being varied at 45 seconds, 60 seconds and 75 seconds. The results are shown in FIG. 9 (with air circulation shown in FIG. 9).

As clearly indicated by the measured results shown in FIG. 9, it was found that, in the case of "with air circulation", the inner surface temperature of the ventilation path 205 is lowered in comparison with the case of "without air circulation". For this reason, as illustrated in Example 2, the compressed air was blown into the foamed parison that had been subjected to a blow molding process through the blow-in needle 14. The compressed air was blown out from the blow-out needle 15. Thus, the hollow blow-molded foam 200 of the present example was cooled at a predetermined blowing pressure. The hollow blow-molded foam 200 of the present example was cooled more quickly than the hollow blow-molded foam 200 of example 1. Therefore, in accordance with the present example, it becomes possible to make the molding cycle of the hollow blow-molded foam 200 more effective. Moreover, the cooling process inside the hollow blow-molded foam 200 can be made more quickly. Thus, the hollow blow-molded foam 200 becomes free from occurrence of ruptured cells due to bulky enlarged cells formed therein and roughened inner surfaces caused by the occurrence of ruptured cells.

Results of Measurements of Surface Roughness

In example 1, the surface roughness of the ventilation path 205 of the hollow blow-molded foam 200, with a cooling time being set to 60 seconds. The results are shown in FIG. 10(*a*) (without air circulation in FIG. 10(*a*)). Moreover, in Example 2, the surface roughness of the ventilation path 205 of the hollow blow-molded foam 200 was measured, with a cooling time being set to 60 seconds, based upon JISB0601 (1994). The results are shown in FIG. 10(*b*) (with air circulation shown in FIG. 10(*b*)). These results were obtained by measuring 5 points on the surface of the ventilation path 205 so that the average value (AYE) thereof was calculated. In FIG. 10, Ra represents an arithmetic average roughness, Ry represents a maximum height, Rz represents an average roughness based upon 10 points, and Sm represents an average interval between concavities and convexities.

As clearly indicated by the measured results of FIG. 10, it was found in the case of "with air circulation", the irregularities 208 on the surface inside the ventilation path 205 were made gentler than those in the case of "without air circulation". That is, as described earlier, in Example 2, the compressed gas was blown into "the foaming parison having been subjected to a blow-molding process" through the blow-in needle 14, and blown out from the blow-out needle 15. With this arrangement, the hollow blow-molded foam 200 was cooled at a predetermined blowing pressure. For this reason, Example 2 allows the irregularities 208 on the surface inside the ventilation path 205 of the hollow blow-molded foam 200 to become gentler in comparison with example 1. Moreover, in Example 2, the surface of the ventilation path 205 can be formed into a shape that allows a fluid to flow more easily in the flow path direction A. As a result, the flow-rate efficiency of a fluid that passes through the inside of the hollow blow-molded foam 200 can be improved.

Results of Pressure Loss Measurements

Figure 12:
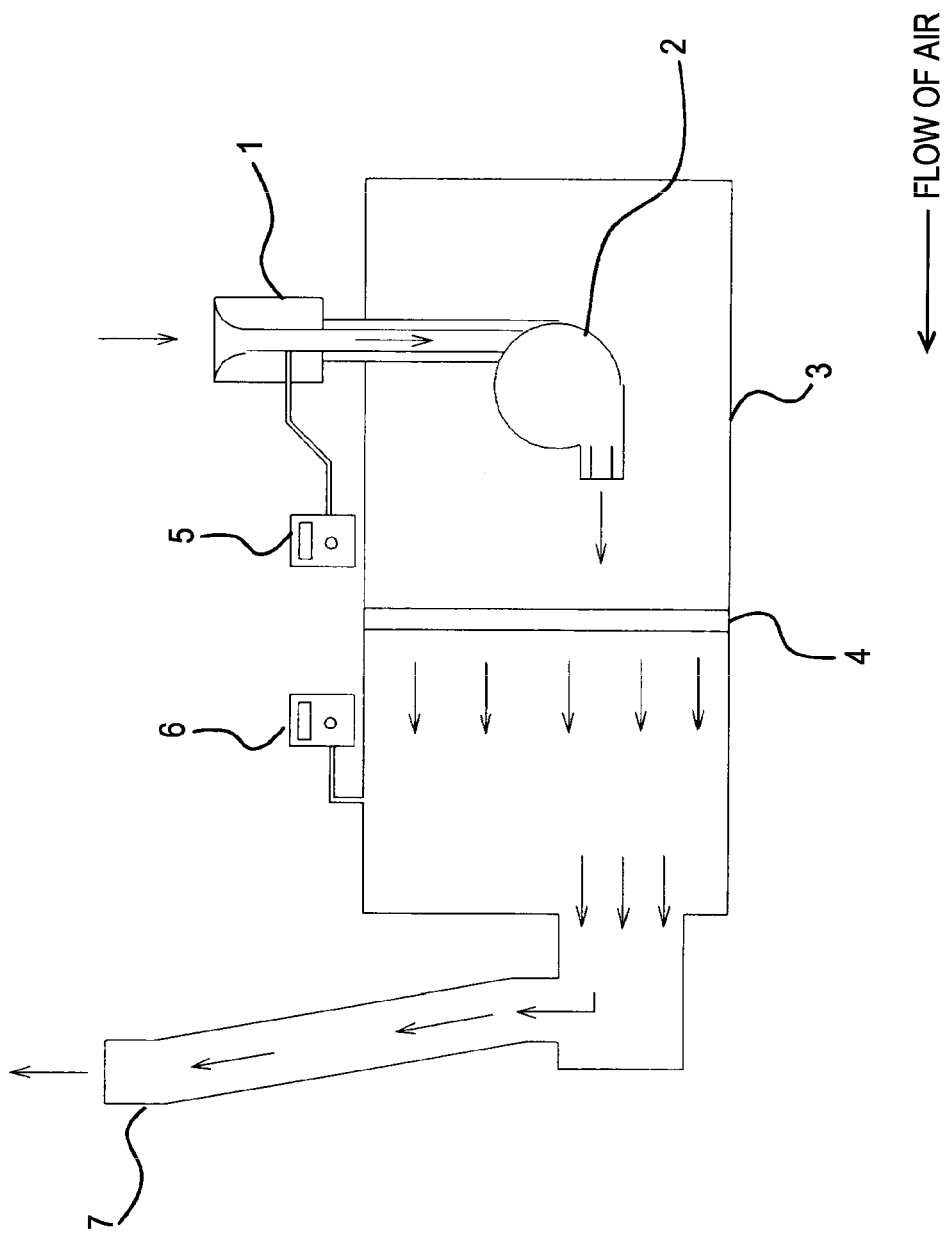
FIG. 12 is a view that illustrates a structure of a pressure-loss measuring device.
Figure 13:
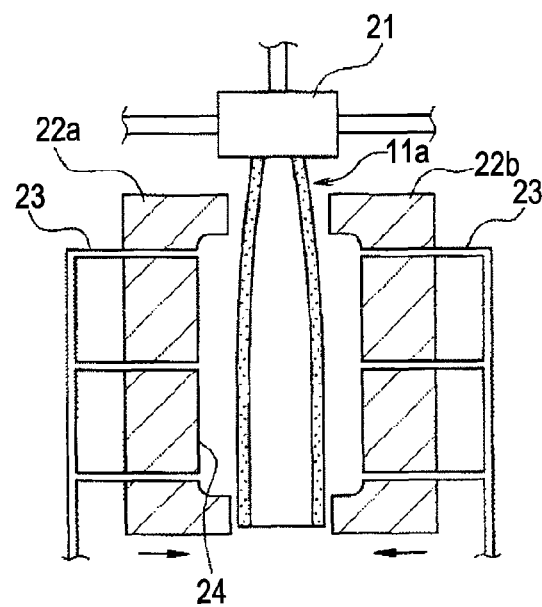
FIG. 13 is a first view that explains a related art method of preparing a hollow blow-molded foam.
Figure 14:
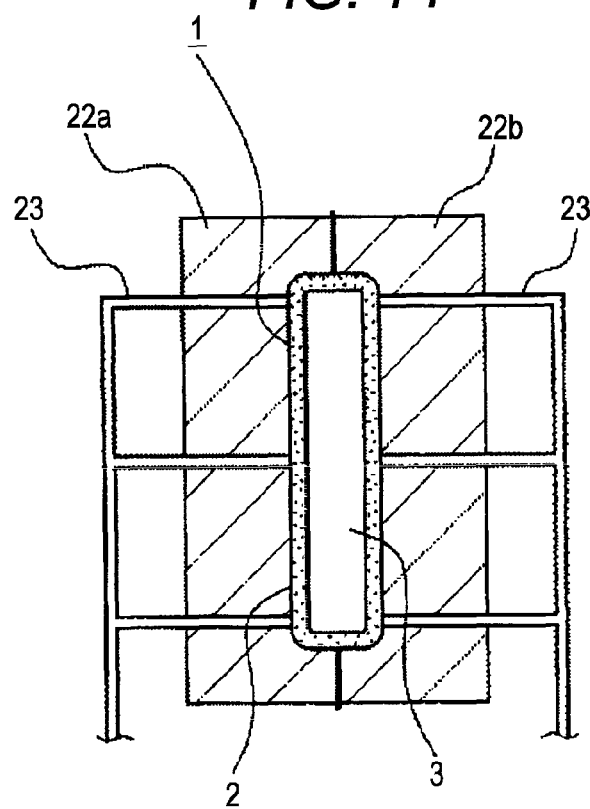
FIG. 14 is a second view that explains a related art method of preparing a hollow blow-molded foam.

In example 1, a hollow blow-molded foam 200 was molded with a cooling time being set to 60 seconds. Next, the pressure loss of the hollow blow-molded foam 200 was measured. The results are shown in FIG. 11 (without air circulation in FIG. 11). Moreover, in Example 2, a hollow blow-molded foam 200 was molded with a cooling time being set to 60 seconds. Next, the pressure loss of the hollow blow-molded foam 200 was measured. The results are shown in FIG. 11 (forward air circulation direction in FIG. 11). Moreover, in Example 3, a hollow blow-molded foam 200 was molded with a cooling time being set to 60 seconds. Next, the pressure loss of the hollow blow-molded foam 200 was measured. The results are shown in FIG. 11 (reversed air circulation direction in FIG. 11). In this case, the results of the pressure loss measurements were obtained through the following procedures by using a pressure loss measuring device shown in FIG. 12. In this case, the gas volume in the system was adjusted by "a bell-mouth flow meter 1 in compliance with JISB8330".

First, the hollow blow-molded foam 200 is connected to a pressure chamber 3 as a measuring sample 7. Next, a blower 2 is activated. In this case, a rectifier mesh 4 is disposed in the pressure chamber 3. This rectifier mesh 4 rectifies air blown from the blower 2. Next, a pressure P of a first differential pressure meter 5 (an average value within 60 seconds) connected to the bell-mouth flow meter 1 is measured. By using the following expressions, an air flow rate Q is calculated.

$$Q = 60\alpha A (2P/\rho)^{1/2}$$

$$\beta = 1.293 \times 273.2 / (273.2 + T)$$

In this case, Q: air flow rate (m³/min), α: flow rate coefficient=0.99, A: pipe path cross-sectional area (m²), p: measured pressure (Pa), p: air concentration (kg/m³), T: temperature (° C.)

Next, by adjusting the output of the blower 2, the above calculated air flow rate Q was formed into a specified flow rate (in the present example, to 333 (m³/h) in supplied gas volume). Next, by using a second differential pressure meter 6, the pressure in the pressure chamber 3 was measured, and a pressure loss at 25° C. (average value within 60 seconds) was calculated. Thus, the results of pressure loss measurements shown in FIG. 11 were obtained.

As clearly indicated by the results of measurements in FIG. 11, it was found that in the case of "with air circulation (forward air circulation direction, reversed air circulation direction)", the pressure loss became smaller than that in the case of "without air circulation". Moreover, in the case of "with air circulation", it was found that in the case of "forward air circulation direction", the pressure loss became smaller than that in the case of "reversed air circulation direction". That is, as described earlier, in examples 2 and 3, the compressed gas was blown into the foaming parison having been subjected to a blow-molding process from the blow-in needle 14, and blown out from the blow-out needle 15. With this arrangement, the hollow blow-molded foam 200 was cooled at a predetermined blowing pressure. As a result, in comparison with the hollow blow-molded foam 200 of example 1, the flow rate efficiency of a fluid that flows through the inside of the hollow blow-molded foam 200 can be further improved. Moreover, as illustrated in Example 2, the blow-in needle 14 was stuck into a portion on the inlet 206 side of the hollow blow-molded foam 200 shown in FIG. 1. With this arrangement, a blow-in opening for use in blowing the compressed air into the foaming parison was formed. Moreover, the blow-out needle 15 was stuck into a portion on the outlet 207 side of the hollow blow-molded foam 200 shown in FIG. 1 so that in comparison with Example 3, it becomes possible to further improve the flow rate efficiency of a fluid that flows through the inside of the hollow blow-molded foam 200.

In this connection, in the above-mentioned examples 1 to 3, the hollow blow-molded foam 200 as a final molded product was adjusted. Thus, a hollow blow-molded foam 200 having an expansion ratio of 3.0 folds and a thickness of 2.0 mm was obtained. Next, in the case when the slit width for use in forming the foaming parison was set to 0.5 mm, with a cooling time being set to 60 seconds, an average roughness Rz on ten points was found in the hollow blow-molded foam as a final molded product in the case of "with air circulation". The resulting Rz was 55 μm. Moreover, in the case of "without air circulation", an average roughness Rz on ten points was found in the hollow blow-molded foam as a final molded product was found. The resulting Rz was 80 μm. In the case of "forward air circulation direction", the pressure loss was 200 Pa. In contrast, in the case of "reversed air circulation direction", the pressure loss was 202 Pa. The difference between these pressure losses was 2 Pa.

With this arrangement, even in the case when the thickness of the hollow blow-molded foam 200 as a final molded product was 2 mm, it was found that in the case of "with air circulation (forward air circulation direction, reversed air circulation direction)", the pressure loss is smaller than that in the case of "without air circulation". Moreover, in the case of "with air circulation", it was found that in the case of "forward air circulation direction", the pressure loss is smaller than that in the case of "reversed air circulation direction". However, as compared with the case where the thickness of the hollow blow-molded foam 200 as a final molded product is 3 mm or more, the effect is smaller. For this reason, in order to improve the flow-rate efficiency of a fluid to be allowed to pass through the inside of the hollow blow-molded foam 200, the hollow blow-molded foam 200 as a final molded product is preferably molded so as to have a thickness of 3 mm or more.

Moreover, in the examples 2 and 3, the hollow blow-molded foam 200 as a final molded product was designed to have a thickness of 3 mm, and the slit width for use in forming a foaming parison was set to 0.6 mm, with a cooling time being set to 60 seconds. In this case, when a compressed gas (mist air) in which water is atomized into a mist is used, an average roughness Rz on ten points in the hollow blow-molded foam as a final molded product in the case of "with air circulation" was found to be 45 μm. Moreover, the pressure loss in the case of "forward air circulation direction" was 196 Pa. The pressure loss in the case of "reversed air circulation direction" was 200 Pa. The difference between these pressure losses was 4 Pa.

Thus, it was found that by using a mist air as the compressed gas, "the irregularities 208 on the surface inside the ventilation path 205 of the hollow blow-molded foam 200" can be made more gentle than the state in which no mist air is used. Moreover, it was also found that the pressure loss can be reduced.

Additionally, when, as in the case of Example 2, an average roughness Rz on ten points on the surface of the ventilation path 205 is 69.8 μm or less, the flow-rate efficiency of a fluid that is allowed to pass through the inside of the hollow blow-molded foam 200 can be improved. Moreover, when an average roughness Rz on ten points on the surface of the ventilation path 205 is 100 μm or less, the flow-rate efficiency of a fluid that is allowed to pass through the inside of the hollow blow-molded foam 200 can be further improved.

In the above-mentioned examples 2 and 3, a differential pressure of the blowing pressure was utilized. However, a structure in which no differential pressure of the blowing pressure is utilized may be applied.

In the above-mentioned examples, the slit width for use in forming a foaming parison was set to 0.6 mm so as to allow the hollow blow-molded foam 200 as a final molded product to have an expansion ratio of 3.0 folds and a thickness of 3.0 mm. Moreover, the slit width for use in forming a foaming parison was set to 0.5 mm so as to allow the hollow blow-molded foam 200 as a final molded product to have an expansion ratio of 3.0 folds and a thickness of 2.0 mm. With this arrangement, the foaming parison extruded from the slit is expanded. Moreover, the thickness of the resulting intermediate blow-molded foam 200 becomes thicker than a target thickness of the hollow blow-molded foam 200 of a final molded product, while the thickness at the time of a blow-molding process becomes slightly thinner. For this reason, after a cooling process, the thickness becomes closer to the target thickness of the hollow blow-molded foam 200 as a final molded product. However, the thickness of the hollow blow-molded foam 200 as a final molded product is varied depending on conditions, such as the presence or absence of a pre-blowing process, a blowing pressure, etc. Therefore, the slit width is adjusted on demand depending on the conditions.

The present invention has been described above concretely by way of embodiments thereof. It is needless to say that the invention is not limited to the above embodiments, but that various changes may be made within the scope not departing from the gist of the invention.

For example, in the above-mentioned embodiments, the first wall portion 201 and the second wall portion 202 are composed of the same foaming resin. However, the first wall portion 201 and the second wall portion 202 may be composed of different foaming resins. In this case, it becomes possible to make the respective expansion ratios different from each other.

In a preferable molding method in the third embodiment, a thermoplastic resin sheet in a molten state was used and mold-clamped to be molded into a hollow blow-molded foam 200. However, the hollow blow-molded foam 200 of the present embodiment is not intended to be limited by the molding method explained in the embodiment. For example, a molding method disclosed in JP-A No. 2009-233960 (in which a plate-shaped solidified sheet is re-heated, and the re-heated sheet is blow-molded into a hollow blow-molded foam 200), etc. may be used so as to produce a hollow blow-molded foam 200. In this case also, in the same manner as in the above-mentioned preparation method, this molding method includes the steps of: blow-molding the reheated sheet; after the blow-molding process, sticking the sheet with a blow-in needle 14 and a blow-out needle 15; blowing a compressed gas such as air into the sheet through the blow-in needle 14; and allowing the compressed gas being blown out from the blow-out needle 15 after having passed through the inside of the sheet, and the hollow blow-molded foam 200 is cooled by these processes. Thus, it is possible to easily cool the hollow blow-molded foam 200. Moreover, the irregularities 208 on the surface of the ventilation path 205 of the hollow blow-molded foam 200 can be made gentler. Furthermore, the ventilation path may be formed into a shape that allows a fluid to easily flow over the surface of the ventilation path 205 in the flow path direction A.

Moreover, upon using the hollow blow-molded foam 200 as a duct, "the flow rate at the time of directing a compressed air into the ventilation path 205" may be adjusted in accordance with the flow rate of a fluid to be supplied into the ventilation path 205.

Furthermore, the above-mentioned embodiments have exemplified a structure in which two split mold blocks 12a and 12b are used. However, the number of split mold blocks is not limited to two. Any desired number of split mold blocks may be used.

In the above-mentioned embodiments, explanations have been given to a hollow blow-molded foam 200 that is desirably used for automobiles. However, the hollow blow-molded foam 200 of the present embodiments is not intended to be limited by automobiles, and by designing and modifying the shape of the hollow blow-molded foam 200 on demand, it can be applied to transporting devices such as trains, ships, airplanes, etc. Moreover, the hollow blow-molded foam 200 of the present embodiments can achieve light-weight and low costs. Therefore, the costs of the transporting devices can be cut, and the fuel costs of the transporting devices can be improved.

As described above, the present invention can be applied to transporting devices, such as automobiles, trains, and ships.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method of forming a blow-molded foam duct comprising the steps of:

preparing a foaming parison or resin sheets with its value of MFR MT, which is a multiplication value of MFR (g/10 minutes) and MT (cN), being set to 13 or more at 200° C., sandwiching the foaming parison or resin sheets with molds to mold a completed blow-molded foam duct having a ventilation path through which a cooled or warmed air current is supplied when said duct in use having an inlet side through which said cooled or warmed air current enters said duct and an outlet side through which said cooled or warmed air current exits said duct;

blowing a cooling fluid from a blow-in needle by inserting the blow-in needle into a portion constituting said inlet side of the duct, and discharging a compressed fluid from a blow-out needle by inserting the blow-out needle into a portion constituting said outlet side of the blow-molded foam duct, and allowing the cooling fluid to flow through the ventilation path so as to cool the blow-molded foam duct, wherein the cooling fluid flows in the same direction as a flow path direction in which the cooled or warmed air currant flows through the ventilation path when the blow-molded foam duct is in use, and the blow-molded foam duct is formed as one having a closed cell structure and smooth surface of the ventilation path so as to have less pressure loss when the cooled or warmed air current flows through the ventilation path from the inlet to the outlet than that in the case when the cooled or warmed air current flows through the ventilation path in a reversed direction.

2. The method of forming a blow-molded foam duct according to claim 1, wherein a foaming resin is sandwiched with molds, and the fluid is allowed to flow into the inside of the foaming resin so that an inner pressure of the foaming resin is equal to or higher than atmospheric pressure to mold the blow-molded foam duct having the ventilation path, while the blow-molded foam duct is being cooled.

3. The method of forming a hollow blow-molded foam duct according claim 1, wherein the hollow blow-molded foam is formed as one having a thickness of 3 mm or more.

4. The method of forming a blow-molded foam duct according to claim 1, wherein the hollow-blow molded foam is cooled by allowing a fluid formed by atomizing a cooling medium into a mist to flow the ventilation path.

5. The method of forming a blow-molded foam duct according to claim 1, further comprising the steps of: forming a blow-in opening for use in flowing the fluid into the ventilation path and a blow-out opening for allowing the fluid to blow out from the ventilation path in the hollow blow-molded foam; and cooling the hollow blow-molded foam by blowing the fluid into the ventilation path from the blow-in opening, while the fluid is being blown out of the blow-out opening.

6. The method of forming a blow-molded foam duct according to claim 5, wherein upon using the hollow blow-molded foam as a duct, the blow-in opening is formed on the inlet side for supplying the cooled or warmed air current to the ventilation path, and upon using the hollow blow-molded foam as a duct, the blow-out opening is formed on the outlet side for discharging the cooled or warmed air current from the ventilation path.

7. The method of forming a blow-molded foam duct according to claim 1, wherein a blow-molding process is carried out at a blowing pressure of 0.5 to 3.0 kg/cm2.

8. The method of forming a blow-molded foam duct according to claim 1, wherein a regulator provided to the blow-in needle and a regulator provided to the blow-out needle are connected with a tube, and the fluid is blown into the ventilation path through the blow-in needle and the fluid is blown out from the blow-out needle so as to cool the blow-molded foam duct.

* * * * *